United States Patent [19]
Daniels

[11] Patent Number: 5,198,113
[45] Date of Patent: Mar. 30, 1993

[54] SEPTIC SYSTEM FILTERING ARRANGEMENT, FILTER MATERIAL AND METHOD OF USING

[76] Inventor: Byron C. Daniels, R.D. #1-Box 269-2, Effort, Pa. 18330

[21] Appl. No.: 601,985

[22] Filed: Oct. 23, 1990

[51] Int. Cl.$^5$ ............................................. C02C 3/00
[52] U.S. Cl. .................................... 210/608; 210/767; 210/806; 210/170; 210/238; 210/441; 210/449; 210/485
[58] Field of Search ............... 210/170, 238, 435, 441, 210/448, 449, 460, 484, 485, 496, 532.2, 747, 804, 806; 55/505

[56] References Cited

U.S. PATENT DOCUMENTS

| | | |
|---|---|---|
| 54,598 | 5/1866 | Randolph . |
| 1,041,887 | 10/1912 | Schodde . |
| 1,281,147 | 10/1918 | Dehn . |
| 1,454,723 | 5/1923 | Burtis . |
| 1,746,121 | 2/1930 | Levy . |
| 1,830,713 | 11/1931 | Palmer . |
| 1,894,031 | 1/1933 | Edwords . |
| 2,061,781 | 11/1936 | Stein . |
| 2,285,833 | 6/1942 | Platt . |
| 2,467,021 | 4/1949 | Fischer . |
| 2,595,538 | 5/1952 | Rausch . |
| 2,660,315 | 11/1953 | Laskey . |
| 2,684,763 | 7/1954 | Siskavitch . |
| 2,781,914 | 2/1957 | De Voe . |
| 3,029,950 | 4/1962 | Frasca . |
| 3,332,552 | 7/1967 | Zabel . |
| 3,460,675 | 8/1969 | Hicks et al. . |
| 3,568,838 | 3/1971 | Applgren et al. . |
| 3,642,138 | 2/1972 | Sheda . |
| 3,707,236 | 12/1972 | Takebayasi ............... 210/449 |
| 3,722,186 | 3/1972 | Parker et al. ................ 55/505 X |
| 3,950,252 | 4/1976 | Jordan et al. . |
| 4,104,166 | 8/1978 | LaRaus . |
| 4,211,543 | 7/1980 | Tokar et al. ................. 210/484 X |
| 4,224,155 | 9/1980 | Milne ............................ 210/170 X |
| 4,319,998 | 3/1982 | Anderson . |
| 4,439,323 | 3/1984 | Ball . |
| 4,501,665 | 2/1985 | Wilhelmson . |
| 4,505,813 | 3/1985 | Graves . |
| 4,614,584 | 9/1986 | DiDuca . |
| 4,710,295 | 12/1987 | Zabel . |
| 4,882,045 | 11/1989 | Bergh et al. . |
| 4,921,606 | 5/1990 | Goldman ....................... 210/238 |

OTHER PUBLICATIONS

Perry et al., Chemical Engineers' Handbook, 4ed, 1963, pp. 19-58.

*Primary Examiner*—Charles Hart
*Attorney, Agent, or Firm*—O'Keefe & Wilkinson

[57] ABSTRACT

A filtering arrangement is provided for effluent from a septic tank prior to passage to a drain field or other disposal. The filtering arrangement makes use of an open-top, U-shaped filter means into which the septic effluent is conducted from the top, preferably through a T-fitting providing an open-topped channel leading into the U-shaped filter. The filter is preferably formed of an outer perforated casing and an inner lining of an open-cell-type polymeric material which effects the filtering of the effluent. The U-shaped filter is preferably suspended from the T-fitting. The arrangement provides fail-safe filtering automatically adjustable for varying flow rates and conditions of the filter. The polymeric filter medium is changed periodically to maintain efficiency.

32 Claims, 4 Drawing Sheets

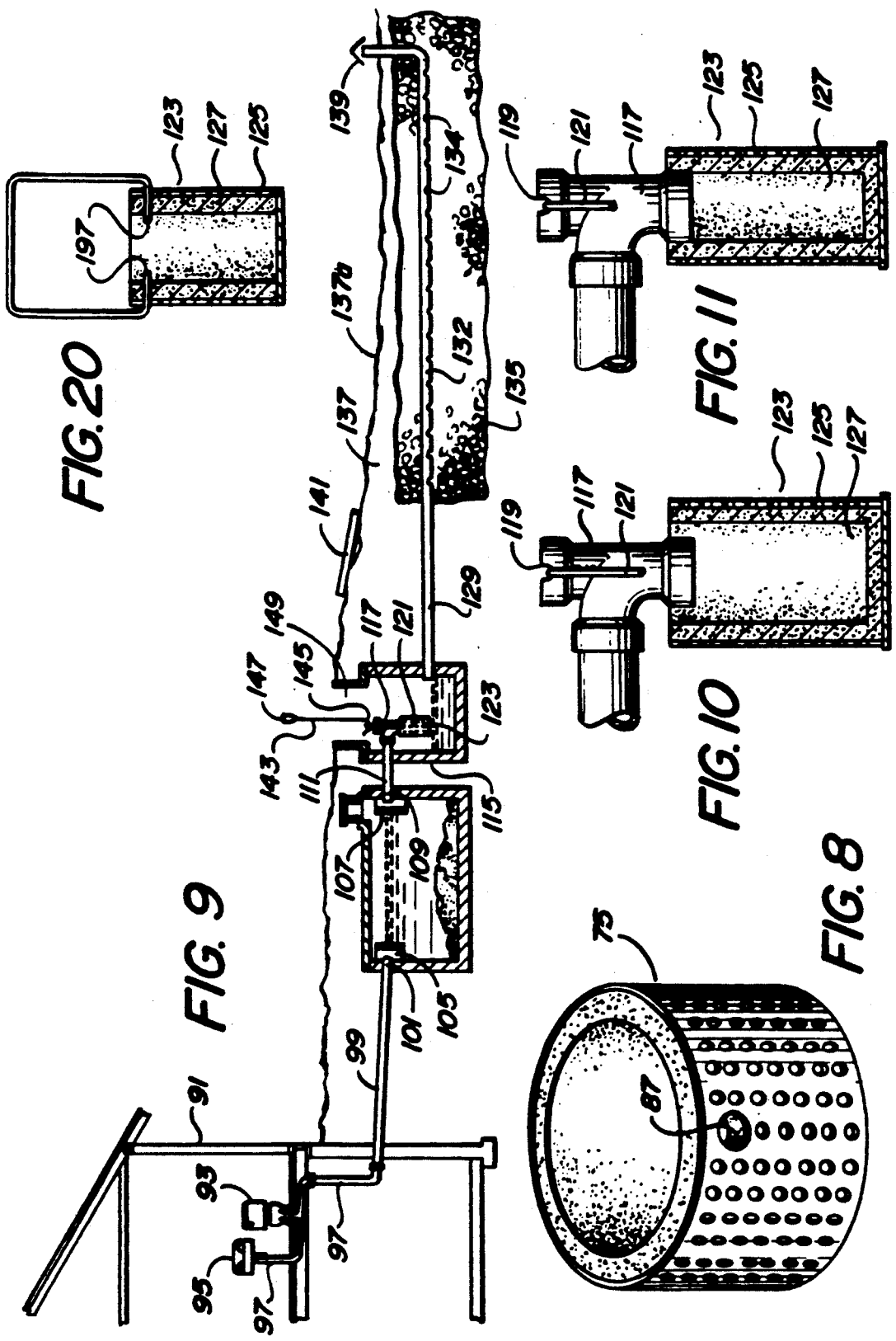

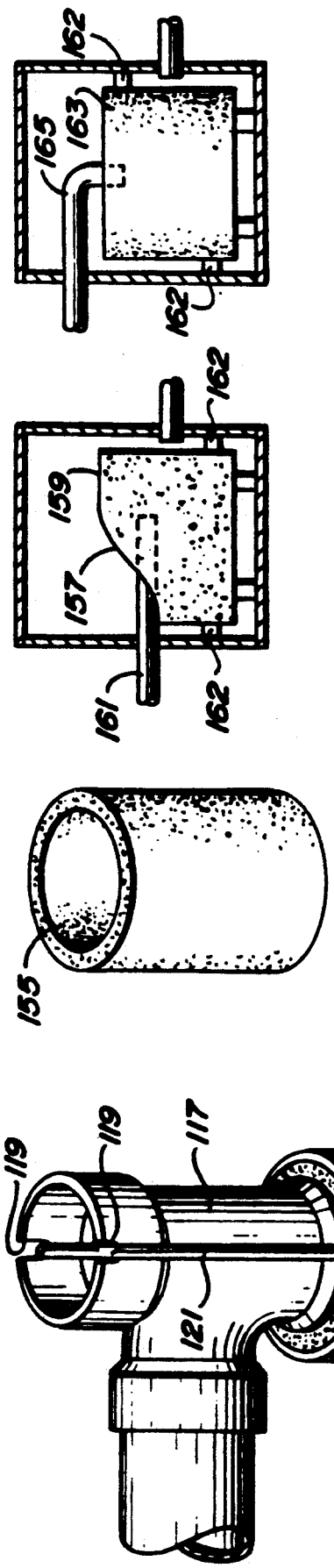
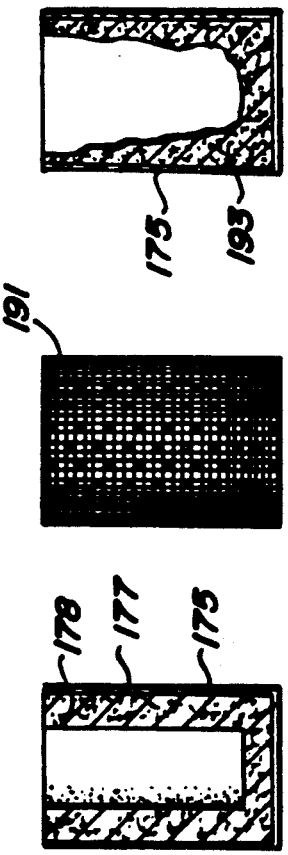
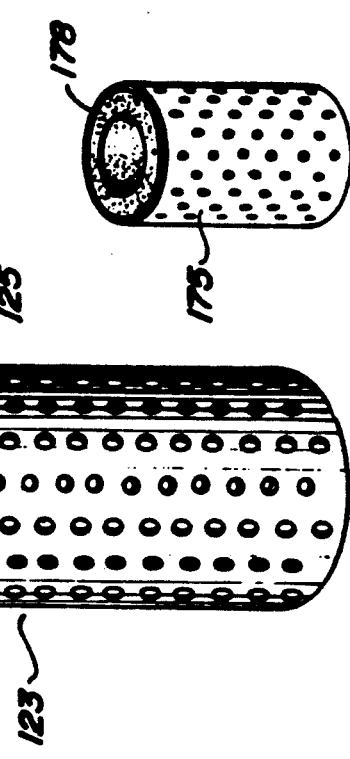
FIG. 12  FIG. 13  FIG. 14  FIG. 15  FIG. 16  FIG. 17  FIG. 18  FIG. 19

SEPTIC SYSTEM FILTERING ARRANGEMENT, FILTER MATERIAL AND METHOD OF USING

BACKGROUND OF THE INVENTION

(1) Field of the Invention

The present invention relates generally to sewage treatment and more particularly to septic tank sewage treatment systems. More particularly still, the invention relates broadly to filtering the effluent from a septic tank system and to a filter arrangement and method for filtering septic tank discharge prior to passage of such effluent to a drain field or other ground disposal system to prevent clogging or plugging of such drain field or system.

(2) Description of the Prior Art

Municipal treatment systems usually comprise widespread pipe collection systems capped by large scale treatment facilities including settling, coarse and fine filtering and possible other treatments, denoted usually as primary, secondary and, less frequently, tertiary treatment of the sewage. Not unexpectedly, private sewage treatment systems are usually relatively more simple. One of the most widespread presently used private treatment arrangements involves the use of septic holding tanks in which solids originally discharged from a waste source with the liquid portion of the sewage or waste are allowed to settle in a large tank or tanks. The overflow from the septic tank is directed into either a so-called dry well from which it percolates into the ground, where passage through rock and ground strata further purifies the waste water and removes harmful bacteria and other noxious components, or into a so-called drain field comprised of a series of perforated ceramic pipes or drains laid into shallow trenches in the ground from which the liquid portion of the sewage is absorbed or percolates into the ground where it is likewise purified by passage through the ground strata.

With the widespread exodus from city environments to suburban and semirural environments, the use of septic systems, so called because of the use of a "septic tank" into which septic or bacteria-laden liquid and included solid or semisolid materials are discharged for temporary holding and settling of the solids from the liquid material discharged into the tank, has been growing at a rapid rate. Such widespread use of septic tank systems results from the fact that only a limited number of suburban and substantially no rural areas have municipal or public sewage collection and treatment systems. Other individual treatment systems such as basic cesspools or holding tanks, dry systems and the like are also available, but none has become popular because of various problems, expenses and other inconveniences. Consequently, while the trend for some years in the past was away from the use of the "septic" and other localized or private sewage treatment arrangements, as cities and large towns converted their residents' sewage disposal systems from private systems to large public systems, with the recent exodus of city residents to suburban and semirural environments surrounding most cities beginning soon after the second world war the trend to municipal systems has substantially reversed. Septic-type systems are presently growing apace. Furthermore, with the burgeoning suburban and semirural population and the increasing environmental consciousness of such population, efficient and effective sewage treatment on a small scale within the confines of a residential property or small business or industrial environment has assumed more and more importance.

Typically the overflow from a septic tank passes first into a distribution box before it is distributed into a drain field. The well regulated septic tank may ordinarily discharge suspended solids in an amount of about 125 to 175 parts per million of the effluent waste water after it leaves the septic or sewage tank, although this will vary depending upon the amount of flow from the tank and other factors including the level of solids maintained or accumulated in the bottom of the tank. The amount of suspended solids in the supernatent liquid tends to increase or decrease in inverse ratio with distance from the accumulated solids at the bottom of the septic tank. When the solids reach an unacceptable level in the tank, an excessive amount of solids tends to be discharged with the effluent. Consequently, when the level of solids becomes too high or the rate of included solid overflow excessive, the tank must be "pumped" or discharged into a tank truck and the contents disposed of. Various schemes for deciding when the amount of solids passing to the drain field is excessive have been devised, including the use of filters to catch the solids and estimate how much is escaping into the drain field. The escape of solids into a drain field is highly undesirable because it tends to clog up such drain field, which, when clogged, is almost impossible to unclog and must usually be replaced at considerable expense. In order to get penetration of the effluent into the drain field pipe, it is desirable that the overflow vary in intensity so that it will flow through the pipe towards its end and be distributed along the length of the pipe rather than all stopping at one point possibly quickly clogging the system at that point. So-called "dribble systems" in which the sewage overflows or continuously flows in a "dribble" into the drain field are usually not favored, but instead, the effluent is preferably "dosed" into the field with a slight "head" or force behind the flow. It is difficult to arrange for reliable alternating flow, however, particularly as the flow rate by the time it has been distributed into a large drain field may be very low.

The drain field trenches, which typically comprise a trench having a depth of about 2 to 3 feet and two-and-a-half feet in width in which a ceramic pipe having perforations or openings therein of about one-half inch in diameter is laid, are filled usually with gravel or crushed rock and covered over by soil and back filled to grade level. Some systems involve only a single trench leaving room for later adjacent construction of additional trenches when the first drain field pipe eventually clogs. Other systems can include a series of trenches with provision to switch the effluent from one to another via a distribution junction box to prevent saturation of any one trench. The drain trenches in these systems are provided with time between "dosings" to regenerate by decomposing and generally disposing of liquids and small solid particulates between use. Since a drain field is normally continuously receiving a small amount of overflow solids from its disposal or waste tank, which is usually in the form of a septic tank, and the internal spaces of the drain pipes and external surrounding spaces within the trench cannot expand, the drain field must inevitably become too clogged to continue in operation and must be shut down and replaced. Such inevitable shutdown can be delayed by proper operation of the system to either (a) prevent as much as possible the escape of solid materials into the drain field and/or (b) by increasing the decomposition of the solids within the drain field to encourage liquefaction of the solid materials into a form that can be flushed away. It has been reported in some cases, in fact, that it is desirable to have very small particulates escape into the drain field as this tends to provide general decomposition therein, actually tending to decrease or even reverse solid buildup.

In recent years the use of so-called sand mounds has become popular or even mandated in some areas. Sand mounds, as indicated by the name, are mounds of sand placed upon the normal surface of the ground. Smaller than normal drain pipes are incorporated into such mounds. The drain pipes are usually one-and-one-half inches in diameter and have three-sixteenth inch drain openings spaced at about six-foot intervals. The pipes are surrounded by crushed rock placed upon varying depths of sand and the entire mound is then covered with soil and planted or landscaped. The septic effluent is frequently pumped to the sand mound because of its higher surface location with respect to the usual location of a septic tank. The pump is normally run intermittently in order to dose the drains and obtain better liquid penetration. Also a cleanout pipe or connection is frequently provided at the top of the mound. This pipe may be connected to a hose to flush out the drain field pipe or pipes. While the pipes are usually, in fact, flushed out, unfortunately the pipe orifices as well as the drain field frequently remain largely or partially blocked. In fact, the flushing itself may serve to force solid particulates compactly into the sand mound reducing its permiability.

It has been recognized that it might be advantageous to filter solid material from the overflow from a septic tank system (a) to decrease, or even completely eliminate, the usual small amount of solids passing to the drain field and/or (b) to prevent the escape of too large an amount of solids from the septic tank to the drain field during excess flow from the septic tank or (c) to prevent the escape of solids to the drain field as a result of excess buildup of solids in the septic tank. While attractive in theory, such filter arrangements have largely not proved to be practical or effective in preventing the clogging of drain fields. This has been because the filter either interferred with the normal flow of liquid effluent to the drain field, was not easily replaced, did not effectively filter very small particles from the effluent liquid or was impractically complicated or expensive.

Among the more notable proposals for the use of filters to strain or treat the overflow from a septic tank are the disclosures of the following patents:

U.S. Pat. No. 1,454,723 issued May 8, 1923 to W. T. Burtis broadly discloses the use of a filter arrangement with a septic tank system. A removable filter is comprised of a removable basket filled with alternate layers of sand and gravel to effect initial filtering of waste water received from a cesspool, septic tank or grease trap. The filtering system in the Burtis arrangement is not located between a cesspool and a drain field, but is located at the end of the system over a dry well into which the effluent is discharged.

U.S. Pat. No. 3,332,552 issued Jul. 25, 1967 to R. L. Zabel discloses a filter for placement directly in a septic tank. The filter is attached to the overflow from such septic tank and is made in a tubular shape with a series of dam and weir units in a stacked arrangement. The inlet to the septic tank is in a T-shape conducting the liquid to a lower portion of the tank about at the level of the bottom of the dam and weir filter arrangement at the overflow side of the septic tank.

U.S. Pat. No. 3,460,675 issued Aug. 12, 1969 to R. M. Hicks et al. discloses a septic tank inspection arrangement. Hicks discloses that it is desirable to prevent solid material from escaping from the septic tank and penetrating into the leach or drain field area, stopping up the leach field and destroying the operation of the field. Hicks provides a separate trap between the septic tank and the drain field into which solid materials tend to flow and are collected in a receptacle in the trap. The receptacle is provided with a handle which extends to the surface of the trap and after removal of a cover, the receptacle can be lifted up and examined to determine how much solid material is flowing from the septic tank to the drain field or into the trap. If no solids are collected in the trap, the homeowner knows that none are flowing to the drain field, while if there are solids in the trap, he knows that some may be flowing to the drain field and that the septic tank should be cleaned to lower the level of solids before the drain field is plugged up and ruined. The trap is in the form of a removable bucket or container rather than a filter. Since the test applied is qualitative rather than quantitative it is not important that all solids are not caught.

U.S. Pat. No. 3,642,138 issued Feb. 15, 1972 to R. F. Sheda discloses a filtering tank for use with a septic system. The filtering tank has an inlet and an outlet and a series of filters formed from, for example, chopped spagnum moss as a natural filtering material. The moss is retained in cages which may be lowered by a hook into position in the bottom of the filtering chamber. A removable insulation panel is also disclosed across the top of the filter units to prevent the filtering unit from becoming too warm during hot weather.

U.S. Pat. No. 4,104,166 issued Aug. 1, 1978 to J. LaRaus discloses a purification tank which may be used between a septic tank and a drain field. The purification tank in which the sewage or effluent from the septic tank is treated with oxygen or ozone includes a multipart filter in the bottom through which the material flows or is pumped to the drain field. The filter is provided with a bail on the top so that it may be removed by means of a hook from the surface by opening the top of the purification chamber. There is also an arrangement for backwashing the filter if necessary. The filter has a screen on the bottom over which there is a layer of peat gravel, covered by a layer of anthrofil, or granulated coal, with a surmounting layer of the fine sand. Other filter arrangements may be used. It is said that the filtered fluid is so clear that it may be used for certain low-grade purposes such as irrigation, toilet use, lawn sprinkling or the like. It is also stated that because the cleaned effluent contains no solids, it requires a smaller leach field than the ordinary septic tank system. The filter is removed for cleaning or replacement periodically as it becomes contaminated.

U.S. Pat. No. 4,319,998 issued Mar. 16, 1982 to J. D. Anderson discloses a monitor for an effluent system used between a septic tank and a disposal field. A separate monitor chamber is provided between the septic tank and the field in which there is a screen. The screen is arranged in the monitor chamber with a vertical orientation so that when the screen is clean, liquid flows through it unobstructed while when the screen becomes partially occluded by solid materials, the liquid backs up on the feed side of the screen. A suitable detector is arranged to detect any such backup of liquid, thus warning that the screen has become clogged due presumably to an excessive of solid materials overflowing from the septic tank. This then, in effect, warns the user that the septic tank should be cleaned.

U.S. Pat. No. 4,439,323 issued Mar. 27, 1984 to H. L. Ball discloses a method for filtering waste water from a septic tank. Ball discloses that mechanical filtering devices placed within septic tanks have generally been unsuccessful because the filter quickly became clogged by the solids present in the tank. Various expedients for avoiding such clogging have been used. Ball provides a hollow screen within a housing within the septic tank with the inlet arranged in the area of relatively particle-free liquid. The filter is also protected from solid materials floating on the surface of the water by the external wall of the filter chamber within the septic tank. The result is that Ball is able to use a large filter area with a feed taken from a fairly restricted level within the septic tank within which few solids are found which might otherwise tend to quickly clog up the filter.

U.S. Pat. No. 4,614,584 issued Sep. 30, 1986 to M. B. Di Duca discloses a distribution box for a drain field receiving effluent from a septic tank. The distribution box is provided with a horizontal screen through which the effluent from the septic tank seeps downwardly and is directed through suitable piping to the drain field. The filter screen, which is basically a flat horizontal perforated plate or screen, has handles so that it may be conveniently lifted from the distribution box when the top of the box is removed for cleaning and the like.

U.S. Pat. No. 4,710,295 issued Dec. 1, 1987 to R. Zabel discloses a septic tank filter basically similar to the earlier Zabel filter disclosed in his U.S. Pat. No. 3,332,552. The improvement includes a bottom cone arrangement on the filter unit which 'ends to collect solid materials and allow them to escape through a hole in the bottom of the conical bottom cap where they collect on the bottom of the septic tank.

U.S. Pat. No. 4,882,045 issued Nov. 21, 1989 to R. J. Bergh et al. discloses a selective distribution to various selected drainage field trenches making use of a special distribution box. The distribution box enables an operator to change the distribution from one drainage field trench to another when a first trench becomes saturated. Along with the distribution arrangement, Bergh et al. uses a filter arrangement on his distribution unit which filter arrangement prevents excess solids from passing from the septic or sewage tank to the drain field trenches. The core of the distribution unit can be removed together with the filter from the top for cleaning. Bergh et al. also discloses the use of a sensor within the distribution box to determine when the unit may be clogged.

While some of the foregoing patents may disclose operative filter arrangements for filtering the effluent from a septic tank before it is distributed to a drain field for further treatment and disposal, none has proved to be the simple, effective arrangement which is required to prevent drain fields from becoming clogged. In general, the filters of the prior art have either been inefficient, too difficult to change or interfere with dosing of the drain field system. The filters, furthermore, have themselves clogged too easily and quickly. The present inventor has unexpectedly discovered and developed, by careful testing and experimentation, a filter and filter arrangement which largely obviates the various defects of the previous arrangements.

OBJECTS OF THE INVENTION

It is an object of the present invention, therefore, to provide a filtering arrangement for use between a septic tank and a drain field or other ground disposal arrangement that is simple and effective.

It is a further object of the invention to provide a filter arrangement and filter that is more efficient than prior arrangements.

It is a still further object of the invention to provide a filter arrangement that can conveniently and efficiently be changed.

It is a still further object of the invention to provide a filter arrangement in which gravity serves to provide a continuous head on the effluent to enhance the filtering rate.

It is a still further object of the invention to provide a filter and filter arrangement that will allow for uneven flow from a septic tank.

It is a still further object of the invention to provide a filter arrangement in which very small particulates of solid waste materials may be filtered efficiently from septic tank effluent.

It is a still further object of the invention to provide a filter arrangement that can be easily cared for and changed periodically by the homeowner.

It is a still further object of the invention to generally provide a filter and filter arrangement that is more effective than prior arrangements.

It is a still further ojbect of the invention to provide an improved filter material or medium for use in a septic tank filtering arrangement.

It is a still further object of the invention to provide a method of filtering for use in a septic tank drain field arrangement that is more effective and efficient than prior methods.

Other objects and advantages of the invention will become evident from review and consideration of the attached description and drawings.

BRIEF DESCRIPTION OF THE INVENTION

The present invention provides in its preferred form a filter between a septic tank or other settling or holding tank and a ground disposal arrangement for effluent from the septic tank such as a drain field comprising a hollow, open-topped, generally U-shaped or bucket-shaped outer perforated reinforcing casing mounted in a chamber between the septic tank and drain field. The outer reinforcing casing supports a filter material lining the sides of the outer casing. The container and lining is mounted in a position such that effluent from the septic tank drains or is pumped into the filter from the top and drains through the filter into the chamber in which the filter is mounted from which chamber the filtered effluent drains or overflows by gravity or is pumped into the drain field or possibly an intermediate holding tank or the like. The preferred filter medium within the filter casing is comprised of open-cell foam plastic material having the shape of the casing. The casing is preferably supported in the chamber by a hanging bail arrangement, but can be otherwise supported, usually above the bottom of the chamber, in a position where it can be easily reached, removed and replaced by the owner of the disposal system. The open-topped, generally U-shape of the filter medium provides a maximum filter area and provides reserve capacity which effectively adjusts to varying flows from the septic tank without overflowing and the open top allows the effluent to overflow in an emergency from the top without stopping up or plugging the septic tank possibly causing a backup into the building in which the primary drains are. The relative elevation of the filter with respect to the level of liquid effluent in the filter chamber provides a gravitational head upon unfiltered septic effluent and aids continuous effective filtering of the septic tank effluent.

BRIEF DESCRIPTION OF THE DRAWINGS

FIG. 8 is an isometric depiction of an alternative filter element of the embodiment of the invention shown in FIG. 3.

FIG. 9 is a diagrammatic representation of a filtering system in accordance with the invention for a gravity-fed drain system incorporating the present invention for a residential-type septic tank-drain field system.

FIG. 10 is a cross-section of a filter assembly according to a less preferred embodiment of the invention having an overflow opening at the top of the filter.

FIG. 11 is a cross-section of a preferred embodiment of the invention in which there is minimum clearance between the sides of the filter and the lower portion of the T-fitting and the principle fail-safe opening is at the top of the T of the T-fitting.

FIG. 12 is an isometric view of FIG. 11 showing the relatively tight fit between the top of the filter and the bottom of the T.

FIG. 13 is an isometric view of a form of the filter in which the filter material itself is free standing and requires no exterior perforated casing.

FIG. 14 shows an alternative embodiment of the invention wherein the inlet into the filter chamber and the filter passes over a depressed portion of the side of the filter.

FIG. 15 is an alternative embodiment of the invention including an inlet with an elbow bringing effluent directly into the center of the filter from the top.

FIG. 16 is an isometric view of an embodiment of the invention including a fibrous matted filter element within the outer casing.

FIG. 17 shows a cross-section of the matted fiber filter shown in FIG. 16.

FIG. 18 shows the exterior of a preferred filter element casing shown from the exterior.

FIG. 19 is a cross-sectional view of an alternative embodiment of the invention in which the fibers of the filter material are merely loose fibers pressed generally together in the casing rather than being in the form of a distinct pressed shape or otherwise unitarily formed filter element.

FIG. 20 shows a cross-section of an alternative embodiment of the filter of the invention in which the ends of the bail extend through the filter casing and at least partly through the interior filter material to aid in retaining such filter material in place in the casing and in which in addition the filter medium covers only the walls of the filter casing.

DESCRIPTION OF THE PREFERRED EMBODIMENTS

The present invention provides an effective and efficient filter arrangement to filter the effluent from a septic tank prior to passage of such effluent to a drain field. The removal of the solid particulates in the effluent prior to directing the filtered effluent to a drain field or, for that matter, any other ground disposal system, prevents the ground disposal system or drain field from becoming clogged or plugged even after extremely long periods of operation. The Applicant has discovered that if a filter arrangement is provided in accordance with his invention and the filter element is changed periodically, an operation which is facilitated by the preferred mounting, that there is substantially no build-up at all of solids in the drain pipes and a drain field therefore should last almost indefinitely. While some very small amount of solid may reach the drain field, this is just sufficient to encourage complete degradation and liquefaction of all solid materials within the system. The system, furthermore, is fail safe and accommodates varying flows of effluent from the septic tank. The preferred filter material, i.e. an open-cell plastic sponge or foam material, has been found to quite unexpectedly be almost the ideal filter for use in septic tank effluent filtering. The material is both easily placed within a suitable casing, extremely efficient in straining out small particles of solids from septic tank effluent, not easily plugged and can be readily replaced and disposed of when it has collected a significant layer of solid materials.

As indicated above, while there have been a fair number of proposals for filtering effluent from septic tanks and systems to remove small solid particulates therefrom before such particulates have an opportunity to plug the drain field, none of the prior proposals has been particularly successful in doing what it is supposed to do. The filter elements have been likely in addition to become plugged themselves with resultant interruption of the effluent flow. Furthermore, prior arrangements have been, in general, not easily adjustable for varying flow.

Unexpectedly, however, the Applicant has discovered that if a filter is provided that has a substantially open top and a significant vertical height that an efficient fail-safe system that can accommodate fairly wide variations of effluent flow with no loss in efficiency can be provided. The filter preferably takes advantage of a gravitational head of liquid to maintain and encourage efficient and rapid filtering and the filter material can be readily changed and renewed. Furthermore, if the owner of the filter system should forget to change the filter, little detriment will result except escape of some unfiltered effluent into the drain field system. The clogged filter, however, will not back up the system. Other conveniences, advantages and efficiencies will be noted from careful review of the following specifications and appended drawings.

Figure 1:
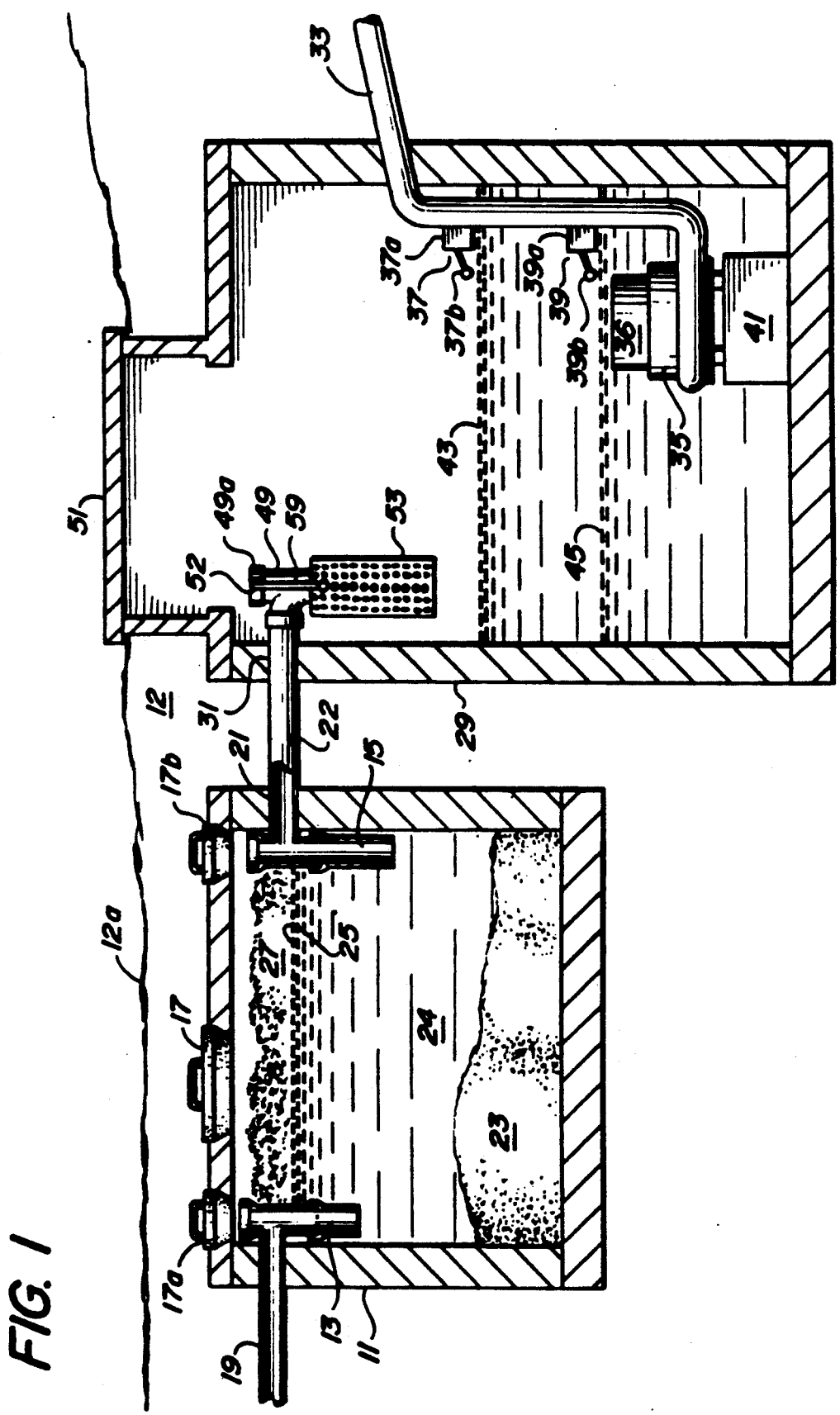
FIG. 1 is a diagrammatic side elevation of a septic tank system incorporating a filter arrangement in accordance with the present invention.

In the figures, FIG. 1 shows diagrammatically, a septic tank 11 buried in the earth 12, which is indicated to have a ground level 12 a. The septic tank 11 has a vertical-pipe type baffle 13 mounted over the end of an inlet 19 to the septic tank, and a second vertical-pipe type baffle 15 mounted over an outlet 21 from the septic tank. These baffles 13 and 15, which are shown in the form of vertical pipes having an opening at the top and bottom pierce the surface of the body of liquid 24 in the septic tank and prevent a surface layer of scum 27 from being respectively interrupted and broken up by flow into the septic tank 11 from the inlet 19 and from flowing out of the outlet 21 with effluent leaving the tank. As a result, the surface scum 27 is more or less permanently confined to the center of the septic tank, although there may be some mutual interchange between the scum layer and the liquid layer 24 in the septic tank. At the bottom of the septic tank 11, there is accumulated a layer of solids 23. The normal water level 25 in the septic tank 11 is indicated to be slightly higher than the lower portion of the outlet 21 allowing flow from said septic tank. It should be understood that this normal water level will vary somewhat with the flow of raw sewage into the septic tank through the inlet 19. When a large flow of raw sewage enters the septic tank, the normal water level 25 will tend to rise and effluent will flow from the outlet 21 through piping 22, to the inlet 31 of a force-pumping sump 29.

A large access cover 17 over the central portion of the septic tank and two smaller access covers 17A and 17B positioned in openings over the vertical baffle pipes 13 and 15 provide emergency and cleanout access to the interior of the septic tank and prevent dirt from the earth overcover 12 from entering the tank. It will also be noted that the septic tank 11 and the sump pump chamber 29 are shown closer together than would normally be the case and the relative sizes of the two chambers or tanks are not shown to scale.

The sump 29 has an outlet 33 through which effluent is passed under the force of a submerged pump 35. The pump 35 is operatively controlled by two level detectors 37 and 39 which will operate to detect a level of liquid within the sump 29. The submerged pump 37 will be operated by a suitable electric circuit, not shown, to be activated when the upper water level 43 of the sump is reached and will be turned off when the lower water level 45 is reached, as detected by the level detectors 37 and 39.

Each level detector 37 and 39 comprises a water proof junction box 37A or 39A provided with a float arm 37B or 39B. Circuitry to connect the level detectors with the pump motor 36 is conventional and does not constitute a part of the present invention and is not therefore shown. The inlet 31 to the sump is provided with a T-fitting 49. The sump 29 is also provided with an access cover 51, located just above the ground level 12a. It will be understood that upon necessity or inclination, the owner of the septic system can remove the top 51 to inspect the sump 29, particularly with respect to the filter to be described hereinafter in further detail. Said filter is positioned broadly between the inlet to the sump and the submerged pump 35. The T-fitting 49 on the end of the inlet 31 is preferably provided with a notch 52 in the upper arm 49A of the T, from which may be hung a bail or handle 59 attached to the filter 53 comprising an outer casing 55 and an inner filter material 57, which, as shown in FIGS. 4 through 7, preferably comprises essentially a separate layer within the casing 55 of the filter 53. As shown, the lower end of arm 49B of the T-fitting 49 extends part way into the upper portion of the filter 53.

The submerged pump 35 which is powered by a motor 36 on top of the pump is preferably supported upon a stand or block 41 to attain a desired level within the sump 29. The motor 36 is shown submerged in the liquid within the sump 29. However, in many installations the motor may be located in the upper portion of the sump out of the liquid. The same may be true of any electrical control apparatus for the pump. Such details do not consitutue any part of the present invention. As raw sewage flows into the inlet 19 of the septic tank 11, such raw sewage is directed generally downward through the baffle pipe 13 and upon exiting from the end of the baffle the solids in the raw sewage tend to continue to sink to the bottom and form a layer 23 of solids as shown in FIG. 1. It will be understood that a certain amount of suspended solids will normally be contained in the liquid portion 24 of the material within the septic tank 11. As one progresses upwardly in the body of liquid within the septic tank 11, however, the amount of suspended solids tends to decrease. Consequently, as the solids layer 23 builds up in the bottom of the septic tank 11, the amount of suspended solids at any point in the liquid above also tends to increase and the percentage of suspended solids in any given portion of liquid overflowing through outlet 21 will tend to rise with the rising level of the solid material accumulated on the bottom of the septic tank 11. As the level 25 of the liquid rises above the outlet 21 from the septic tank, the liquid septic effluent flows upwardly from the main body of liquid through the pipe baffle 15 and out the outlet 21 and through piping 22 to the inlet 31 of the sump chamber 29. Material entering the inlet 31 is discharged into the T-fitting 49 and directed downwardly by the force of gravity through the downward arm 49B of the T-fitting 49. The liquid with suspended solids discharged through the arm 49B of the T-fitting enters the filter 53 through the top. This liquid with suspended solids falls to the bottom of the filter 53 where it first contacts the filter element 57, which, as may be seen in FIG. 4, completely lines the sides and bottom of the filter 53. The filter material 57, which may take several forms, but is preferably a closed-cell plastic sponge or foam material preferably fits snuggly within an outer casing 55 of the filter. The outer casing 55 of the filter 53 has small perforations in it which allow for the escape of liquid after such liquid passes through the filter element 57. It is preferred for the bottom of the filter 63 to be solid to add support to the filter element so that the stream of liquid falling through the lower arm 49B of the T-fitting 49 and impacting upon the filter material 57 at the bottom of the filter 53 will not rupture such filter material which is effectively reinforced by the solid bottom 63. The sides of the filter casing 55 are perforated to allow egress of the liquid after it is passed through the filter element 57. The lowest holes or orifices in the casing should preferably directly adjoin the bottom of the casing to provide an exit for liquid perculating through the filter material at the bottom of the filter. Alternatively no perforate filter material may adjoin the bottom of the filter. During passage through the filter element 57, the liquid effluent from the septic tank has the small solids strained from it so that they do not progress via the pump 35 and the outlet piping 33 to a drain field not shown. If the small solid particles, on the other hand, were discharged to the drain field, they might very possibly plug up such field within a fairly short period.

It has been found that a polymeric open-cell material having internal openings of a size that will filter out of septic effluent substantially all solid materials greater than one thirty-second of an inch in size or diameter does a very effective job in preventing clogging of a drain field. Filter material that will remove smaller particulates such as down to one sixty-fourth of an inch or less may also be effectively used. However, as explained elsewhere, it is believed advantageous in most systems to allow some very small particulates to pass to the drain field to improve digestion of other material in the drain field, including any escaped solids. Also the more restricted the openings in the filter, the more filter area and consequently the larger an overall filter is likely to be required and the more frequently the filter will have to be renewed.

Figure 2:
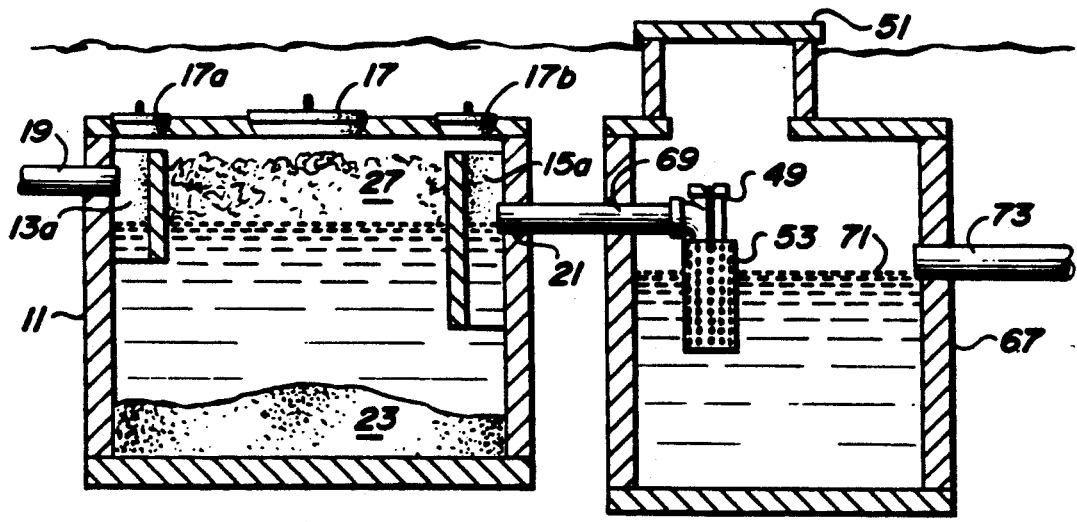
FIG. 2 is a diagrammatic view of an alternative embodiment of the invention.

FIG. 2 shows an alternative embodiment of the septic tank and filter arrangement shown in FIG. 1. The same structures are identified generally in FIGS. 1 and 2 by the same reference numerals. In FIG. 2, instead of there being a sump chamber 29, there is instead a filter chamber 67. As will be understood by those skilled in the art, the passage of the liquid effluent from the septic tank 11 in FIGS. 1 and 2 is completely effected by gravity. In other words, the piping 22, which is connected to the outlet 21 of the septic tank and to either the inlet 31 of the sump chamber in FIG. 1 or the inlet 69 of the filter chamber 67 in FIG. 2 passes septic effluent into the filter 53 by gravity. The effluent, after passing through the filter 53 in FIG. 2 tends to build up to a level 71 within the filter chamber 67 at which point the liquid will flow out of the filter chamber through the lateral 73 which, it may be understood, leads to a conventional drain field. The baffles 13A and 15A in FIG. 2 are in the form of plates secured at their ends to the septic tank walls over the outlets 19 and 21 as known to the art, rather than the vertical pipe baffles illustrated in FIG. 1. The operation of such baffles is in any case essentially the same.

It will be noted that the filter 53 in FIG. 2 is more or less continuously partially submerged in the liquid effluent material within the filter chamber 67, at least so far as the sewage system continues in substantial continuous use. If effluent passing through the filter 53 does so quickly, therefore, there will be little head or hydraulic force associated with the filtering. However, if the filtering slows up, liquid will rise within the filter increasing the head or hydraulic force and increasing the filter rate.

As will be understood, the liquid which passes into and through the filter 53 builds up in the filter chamber 67 to the level 71 at which point it flows from the outlet 73 to a drain field, not shown. The filter 53, therefore, as shown in FIG. 2, will be partially submerged in the liquid within the filter chamber 67 at essentially all times. This tends to keep the filter material from drying out, which might cause a layer of fine solids strained out of the effluent to form a resistant, almost impermiable layer on the surface of the filter element. Continuous partial submergence and moistening is particularly desirable in a filter system that may encounter fairly long periods of non-use such as in a vacation-home-type installation where the system may not be used while the owners are absent. On the other hand, the partial submergence decreases the hydraulic head available in the filter to encourage filtering if a build-up of liquid within the filter occurs. It will be noted that the top of the filter 53 is always maintained above the surface of the water in the filter chamber, at least so long as the drain field, not shown, does not become clogged in one way or another and cause liquid effluent to back up within the filter chamber 67. It will be noted also in FIGS. 2 and 4 that if the filter itself should become clogged, liquid building up within the filter will flow over the top of the filter between the lower portion or arm of the T and the edges of the filter. More desirably still, the sides of the filter material may be pressed substantially securely against the lower portion of the T, as shown more particularly in FIGS. 11 and 12, so that there is little or no clearance between the filter and the T. Such substantial contact may be either direct as shown or indirect. The cup-shape or bucket-shape of the filter, provides an arrangement whereby the effluent from the septic tank enters the filter from the top, allows a body of liquid to build up within the filter as the flow of the effluent from the septic tank increases and to then drain from the filter during a slow down in the discharge of effluent from the septic tank. Consequently, the cup or pail-shaped filter, which can be referred to broadly as a U-shaped filter, allows for differences in flow from the septic tank while at the same time providing a fail-safe arrangement whereby if the flow becomes too great or alternatively the filter becomes clogged, or partially clogged the liquid may flow over the top of the filter, or alternatively, if the opening between the fiter and the lower portion of the T is clogged, narrow or closed, the liquid will flow from the top of the T in a fail-safe mode whereby clogging of the filter will not cause backup into the septic tank and possibly beyond into the laterals and pipes of the residence or industry in connection with which the septic tank is used. As explained above, buildup of liquid elevation in the filter, particularly in installations where the filter is normally maintained above the liquid level in the filter chamber, also provides additional hydraulic head upon the liquid in the filter if desirable to increase the filtering rate.

Figure 3:
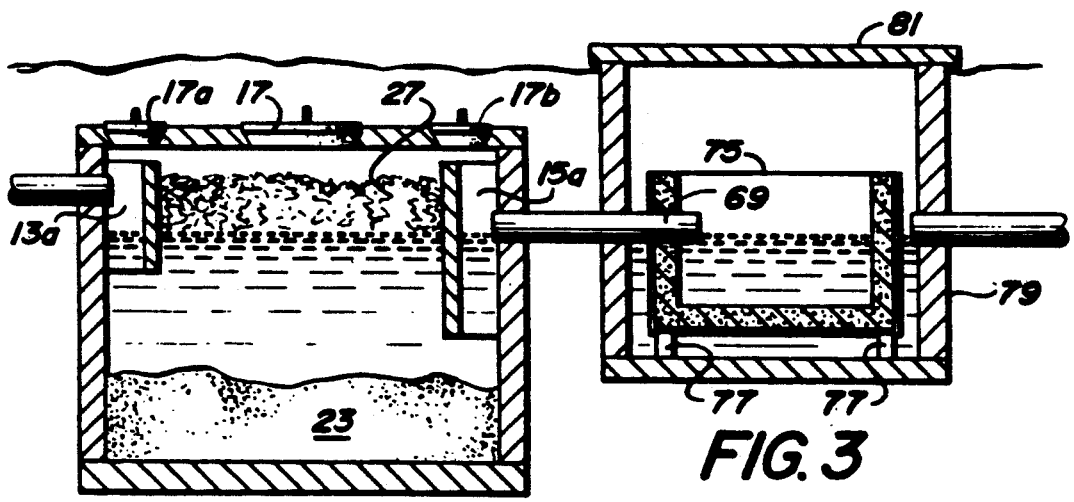
FIG. 3 is a diagrammatic view of a further alternative embodiment.

FIG. 3 shows an alternative arrangement of the filter chamber used in combination with a septic tank in which a filter 75, instead of being suspended from a bail or handle, is instead supported on legs or mountings 77 at the bottom of the filter chamber, which mountings hold the filter 75 at all times slightly above the bottom of the filter chamber. In the embodiment shown in FIG. 3, the inlet to the filter chamber enters the side of the filter 75 through an orifice in the side of the filter better shown in FIG. 8. The filter chamber 79 in which the filter 75 is mounted is substantially like the filter chamber 67 and is provided with an access cover 81 comparable to the access cover 51 shown in FIG. 2. It will be understood that the filter 75 operates in substantially the same manner as the filter 53 in that effluent is discharged into the center of the filter and builds up if the discharge to such filter is fast and flows away if the discharge is slow. Build-up of the septic effluent in the filter automatically increases the hydraulic head upon the effluent and will increase the filter rate.

The filter shown in FIG. 3 is, like the filter shown in FIG. 2, maintained at all times partially under the surface of the liquid within the filter chamber 79 to maintain the filter itself in a moist condition. Sufficient clearance should be present from the sides so that the filter may be slipped into the filter chamber 79 towards the outlet side so that it may be fitted over the inlet pipe 63 where it extends through the side of the filter. Alternatively, a removable outlet on the piping 69 may allow the piping to be removed, the filter 75 to be positioned within the filter chamber and then the piping replaced within the opening or orifice within the filter and secured to the other piping by screwthreads or any other convenient arrangement. While this arrangement is not as convenient for replacing the filter as the arrangements shown in FIGS. 1 and 2, i.e. by hooking a bail or handle of the filter over a notch in the T-fitting, the operation of the filter assemblage is essentially the same. The same efficiencies and convenience of discharge of the effluent into a U-shaped, cup-shapped or pail-shaped filter which easily adjusts to varying flow rates and decreases or increases the filtering rate as may be desirable remains, together with a fail-safe option of having the liquid flow over the top of the filter if necessary to maintain the systemic flow even if the filter should become clogged, thus preventing possible back-up of the entire system. While such emergency top flow will cause a small amount of solids to flow to the drain field, during emergency filter stoppage, this is invariably a better option than having a back-up in the system which can be disastrous to the users of the system.

Figures 4, 5, 6, 7:
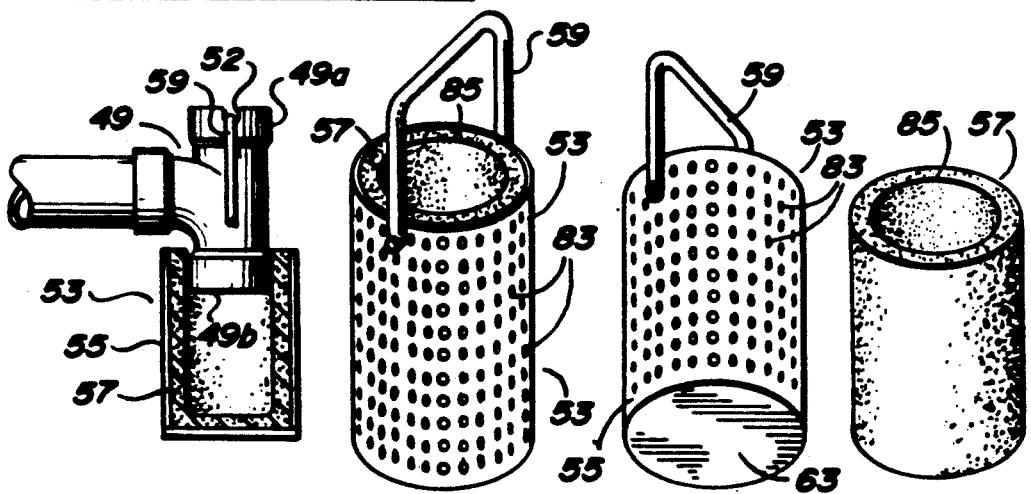
FIG. 4 is a partial side elevation and partial cross section of the filter element and its preferred relation to the T-fitting upon which it is mounted.
FIG. 5 is an isometric representation of the filter and filter material liner of the invention.
FIG. 6 is an isometric view of the filter of the invention shown in FIG. 5 viewed from an alterntive angle.
FIG. 7 is an isometric view of the filter liner comprising one portion of the invention.

FIG. 4 is a side elevation of the preferred filter of the invention shown in cross section hooked in position over the top of the T-fitting. It will be understood that a simple hook may be easily used to hook over the bail when the access cover 51 is open to give access to the filter chamber 67. This is true with the sump chamber 29, as shown in FIG. 1 and with respect to the filter chamber shown in FIG. 2. In both cases, the filter 53 can, after the bail or handle 59 of the filter is first picked up, preferably by a hook or the like, and moved to the side so that it disengages from the notch 52 at the top of the T-fitting, then be lowered until it clears the bottom of the T-fitting, after which the filter can be moved to the side and then brought to the surface, the inside filter element 57 removed and a new filter element installed. The entire filter 53 may then be replaced within the filter chamber 67, or in the case of FIG. 1, within the sump chamber 21 in position on the lower end of the T-fitting after which the bail or handle is lifted bringing the filter upwardly and allowing the bail or handle to be placed over the notch in the top of the T-fitting and after securing in the notch, allowing the filter to slip downwardly into permanent position.

FIG. 5 is an isometric view of the filter 53 showing openings in the side of the casing 55. The smaller, open cell structure of the preferred filter material can also be seen in the top of the filter. The openings in the casing 55 are numbered 83 and the smaller open cell structure of the filter material 57 is numbered 85. The openings in the casing may desirably be about one-eighth inch in diameter.

FIG. 6 is an isometric view similar to FIG. 5, but is oriented to show the bottom of the filter 53. It will be seen in particular in FIG. 6 that the casing 55 of the filter preferably has a solid bottom as shown. This, as explained above, reinforces the bottom of the filter against the force of liquid pouring down upon its top. Otherwise, the open cell foam filter material might tend to rupture after a period of force supplied by the water. Alternatively, the bottom of the filter material could be made thicker or could be formed from a non-porous portion of the plastic material. However, it is preferred to use a porous, open-cell filter material such as plastic sponge material on the bottom of the filter as well as the sides, since some filtering occurs in the bottom and liquid flows along the small space between the solid casing and the filter material and out the sides of the casing, where, as indicated above, it is preferable for the casing to have small orifices very close to the bottom to release the liquid to the exterior.

FIG. 7 is an isometric view of the filter material prior to placement in the casing of the filter. It can be seen that the cells or openings 85 in the surface of the open cell filter material are fairly small.

FIG. 8 is an isometric view of the filter 75 shown used in FIG. 3 showing the orifice 87 in the side of the filter for accomodation of the inlet pipe 69. Otherwise the filter is substantially similar to the filter of FIGS. 1, 2 and 4–7 except for the filter being somewhat larger in diameter and lower.

FIG. 9 shows diagrammatically an entire septic and drain field system provided with the filter arrangement of the invention. In FIG. 9, a house 91 is provided as shown with sewage pipe take offs from plumbing fixtures, such as a water closest 93 in a first floor room with a wash stand 95 positioned next to the water closet. Sewage pipes 97 lead from these plumbing fixtures and it will be understood in most cases from other plumbing fixtures in the building to a main lateral sewage takeoff 99 which leads into a inlet 101 of a septic tank 103. The septic tank 103 is provided with a baffle 105 positioned in front of the inlet and with another baffle 107 placed adjacent to the outlet 109 from the septic tank 103. A suitable conduit or pipe 111 extends from the outlet 109 to an inlet 113 to a filter chamber 115. A T-fitting 117 is provided upon the end of the inlet 113 with the top or transverse members or arms of the T extending vertically. The upper portion or arm of the T has a notch in it 119 in a position to receive the handle or bail 121 of a filter 123 which, as in the previous embodiments, is preferably comprised of an outer casing 12£ and an inner flexible or semi-flexible inner filter element 127. As will be understood from the previous embodiments, the outer casing is preferably provided with small orifices in the side, not shown, and the filter element 127 is formed from an open cell plastic sponge material having a cell diameter and interconnections between the cells small enough to provide a filtering of the contents sufficient to prevent suspended solid materials received through the pipe 111 from the septic tank 103 from passing through the filter element 127. The filtered effluent liquid which does pass through the filter element 127 then passes through the small holes or orifices 83 in the casing and falls to the lower portion of the filter chamber 115. A buildup of such liquid in the bottom of the chamber 115 eventually brings or maintains the surface of the liquid essentially level with the exit pipes 129 and the filtered liquid is then conducted to such exit pipes and any laterals necessary to operation of a perforated drain field pipe 133 positioned within a drain field 135. The drain field 135 may comprise gravel or crushed stone within a trench surmounted with ordinary soil 137 used as an overcover. In the embodiment shown in FIG. 9, the end of the drain field pipe 133 is connected to a vent 139 which extends above the ordinary level of the ground surface 137A. A vent improves flow through the pipe or conduit 131 and into the perforated drain field pipe 133 which, as shown, has the holes 134 which may be approximately ½ inch more or less in diameter. Air vent 139, as indicated, may be desirable to encourage free flow of liquid into the drain field and provide desirable aeration of such drain field. However, it should be understood that many states and localities do not allow the use of a vent 139 in a drain field because of possible resultant atmospheric pollution and contamination. While significant odor should not arise from an effectively operating drain field, particularly when equipped with the filter arrangement of the invention, any odors which might arise from a drain field close to habitation will be particularly offensive and any venting at all may thus be restricted. In such case, the ventilation of the drain field, if any, is primarily through the surface of the ground and, in fact, it may be desirable to have the drain field in such case closer to the surface. Gases given off from the drain field are then, in effect, filtered through the earth and cleansed with such filtering. There is also less danger that a surge in liquid effluent from the septic tank will be passed through the drain field and out the vent contaminating the surface of the ground. Actually, with the use of the filter chamber 115, there is also less chance that any such surge will pass from the septic tank to the drain field at all. The vent 139 may also in the proper case be designed to double as a clean out or flushing connection. This expedient, however, is usually only resorted to in the case of a so-called sand mound installation.

It will be understood that the arrangement shown in FIG. 9 is proportioned and arranged so that the filter 123 is usually maintained clear of the surface of the liquid effluent collected in the bottom of the tank. This arrangement provides the most rapid possible flow through the filter and the filter provides a very effective and efficient filtering of the liquid effluent. It is desirable, however, when such an arrangement is used that there be sufficient use of the system so that the filter material is maintained in a moist condition at all times to avoid drying out and possible baking of a thin solid layer over the inside surface of the filter. Keeping the filter moist will maintain the filter element or material in the best possible condition for long-term use. It will also be understood that filter maintenance or replacement from time to time is highly desirable and eventually necessary. Replacement of the filter may be accomplished by opening the access cover 141 and reaching down into the filter chamber 115 with a suitable hook or other grasping tool such as shown in FIG. 9 and identified by the reference numeral 143. The access cover 141 is shown in FIG. 9 removed and lying on the ground surfaces 137A and hook 143 is shown extended into the opening 149 and in engagement with the bail 121 of the filter 123. The curved portion 145 of the hook 143 may be hooked over the bail 121 on the filter 123 in the center of the upper leg of the T-fitting 117. While using the closed loop 147 on the hook as a hand-hold, the bail 121 may then be lifted out of the notch, 119 better shown in FIGS. 10 and 11 which are to a larger scale, and passed to the side of the T-fitting 117 so that the filter may be moved downwardly until it is disengaged from the bottom of the T-fitting 117. Once the filter 123 is free of the end of the T-fitting 117, the filter may be lifted up by the hook 143 past the T-fitting and out the opening 149 normally closed by the cover plate or access cover 141. Once the filter 123 is completely removed from the filter chamber, the interior filter element or material 127 may be removed or stripped from the inside of the outer casing 125 and replaced by a new inner filter element or material 127. The process of removing the filter 123 from the filter chamber 115 is then reversed and the filter is lowered down into the chamber supported by the hook 143 through the agency of the bail on the filter, and after the top of the filter is engaged with the bottom of the T-fitting, the filter will be lifted up by the hook and the bail will be hooked over the top of the T-fitting and insered into the notch 119 to support the filter in filtering position. If the septic tank 103 is operating correctly, i.e. without excessive flow, and the level of solids within the septic tank, which serves essentially as a large settling tank, is not too high, the filter element or material should last for a considerable time before it again will require changing. Meantime, the filter element 127 will essentially filter out or catch all the light solids suspended in the effluent from the septic tank. The drain field 135 will consequently not become stopped up or clogged and may last substantially indefinitely, particularly as very light, small solids act as a inoculation of putrifactive bacteria which serve in a well operating system to liquify any significant solid material which may either get through the filter or tend to precipitate out of the liquid effluent. As a result, not only do the filter elements last for long periods, but the filter bed or drain field is also able to continue to operate trouble free for an indefinite period.

FIG. 10 shows a less preferred embodiment of the filter 123 combined with the T-fitting 117. As seen in FIG. 10, the filter, which is shown in cross section, has a larger I.D. or Internal Diameter than the O.D. or Outside Diameter of the lower portion of the T-fitting or the lower arm of such fitting Such an arrangement has both advantages and disadvantages. The advantages are that the opening or clearance between the O.D. of the lower arm of the T-fitting and the I.D. of the filter provides sufficient space for the emergency overflow of liquid material which may be unable to pass through the filter because of blockage or partial blockage caused by the filtered solids which the filter is designed to filter out of the effluent. As seen in FIG. 12, it would be substantially impossible, even though the filter is completely coated with a perculation resistant layer of solids, for a backup to occur which would affect the upstream septic tank. Since the open top or clearance between the inside of the filter and the outside of the arm of the T-fitting allows any backed up liquid effluent which may build up in the filters due to slow filtering or a filter that requires changing or replacement, to overflow from the filter over the top of the filter, thus preventing the filter from blocking the entire system. Consequently, if the filter becomes clogged due to inattention or other mischance, all the liquid septic tank effluent will merely overflow over the top of the filter preventing backup in the septic tank which could otherwise, in severe cases, reach all the way back to the original facilities in the building or habitation from which the sewage originates. If, for some reason, the space between the O.D. of the fitting and the I.D. of the filter should become clogged by an excessive amount of solids buildup, any excess liquid will still be free to flow out of the top or upper arm of the T-fitting. Thus, assuming the top of the T-fitting is lower than any openings in the system between the T-fitting and the source building or habitation, there is no way for the filter to back up and cause a foul flood or other inconvenience in such source building or habitation.

FIG. 11 shows an alternative and preferred arrangement of the filter inlet assembly in which a close fit is maintained between the outside of the lower end or arm of the T-fitting and the upper portion of the inside of the filter. The arrangement of FIG. 11 is similar to that shown in FIG. 10 except that a continuous cylindrical arrangement is in effect created by a juncture between the bottom portion of the T-fitting and the upper portion of the filter. This juncture, while not completely liquid tight, does serve a significant purpose in that it extends the vertical range in which liquid may be stored. It also by such storage increases the hydraulic head upon the liquid septic effluent in the filter, thus increasing the filtering rate. In other words, if a high rate of flow is established in the septic tank at any given time, such as when people may be using several showers in a house at the same time, excess liquid may, in essence, be stored or contained in the filter not only up to the height of the filter itself, but also in the extension of the T-fitting above the filter. Such arrangement, consequently, provides a reservoir of liquid which may be progressively fed to the filter during such time as the filter may be overloaded and may be gradually drawing down the amount of excess liquid in the filter. FIG. 12 is an isometric view of the filter arrangement shown in FIG. 11 and shows rather clearly the lack of any significant clearance between the lower arm of the T-fitting and the inside of the filter resulting in the T-fitting essentially forming an upward extension of the filter. Such extension, as explained, serves to provide a greater capacity than otherwise. However, the arrangement is still a fail safe arrangement since any excess septic effluent need merely flow over the top of the upper arm of the T-fitting to be relieved.

FIG. 13 shows an isometric representation of a filter for the invention made or formed essentially out of a fairly rigid material such as a thick, open-cell plastic foam material having sufficient rigidity to support itself. It will be understood that other than for the filter material having sufficient structural strength to support itself plus liquid materials inside rather than depending upon an outer casing for support, the essentials of the filters of FIGS. 10, 11 and 12 are substantially similar. The open cell plastic composition shown in FIG. 13 is particularly desirable, perhaps, to provide a simple disposable filter arrangement in which the whole filter may be merely removed from the filter chamber and discarded.

FIG. 14 shows a variation of the filter 75 shown in FIG. 3 as well as use of a filter material such as shown in FIG. 13. The principal difference between the embodiments shown in FIG. 14 and the embodiment shown in FIG. 3 is that instead of there being an orifice in the side of the filter casing and inner filter material, such as necessary in FIG. 3 and shown more particularly in FIG. 8, the side of the filter element 157 shown in FIG. 14 is cut down so that a pipe may enter the center of the filter so that septic effluent may be discharged directly into the filter from over the side of the filter. The extra height of the elevated section 158 of the filter element 157 on the opposite side from the inlet pipe 160 serves to prevent splashing of septic tank effluent over the top of the filter against the walls of the filter chamber. Since the filter material in the elevated section 158 of the filter element 157 has no real filtering function, this section could be formed from a nonperforate material either of the same composition as the perforate material or of a different material. Preferably spacers 162 are used around the filter chamber to maintain the filter element 157 centered in the filter chamber.

FIG. 15 shows a still further alternative arrangement similar to that shown in FIG. 14, but in which the liquid enters the center of the filter after passing through a feed pipe and a downwardly extending pipe or elbow which serves to direct the septic effluent directly into the center of the filter 163. As in FIG. 14, the filter element 163 is formed from a perforate self-supporting filter material.

FIG. 16 is an isometric view of the filter of the invention including an outer casing 123 plus an inner filter element 177 comprised of a compacted fibrous filter material such as, for example, glass wool or fiber. The individual fibers 178 may be either merely closely compacted or may be bonded more or less securely together by an adhesive or by self-adhesion effected, for example, by heating to an elevated temperature to lightly bond the surfaces of contacting fibers together.

FIG. 17 is a cross-section of the filter shown in FIG. 16. Since the fibers 178 of the filter are essentially lightly consolidated by any suitable means, the filter element will usually have a fairly definitive shape or form. Preferably such shape will be similar to the shape or form of the filter of the invention using an outlet casing to support the filter material.

FIG. 18 shows a preferred embodiment of the invention in which the small orifices in the exterior of the filter casing are preferably overlain with a plastic mesh material. This serves as an insurance that no solid particle more than a certain maximum size pass through the filter. The same result can be attained by limiting the size of the openings in the filter casing. However, it may be more efficient to have the orifices in the casing somewhat larger in order not to constrict liquid flow too much and to avoid plugging. The outside layer of netting then ensures a final sizing. The relatively thin strands of the netting, furthermore, are less easily plugged because the individual strands are thin enough to cut any soft solid materials which are forced against them. The use of the outside netting layer 191, the use of which provides essentially a three layer filter is generally not necessary with the preferred plastic-sponge open-cell material of the invention, but serves as a back up when fibrous filters and, in particular, unconsolidated fibrous filter materials such as shown in FIG. 19 are used. Such filters may have voids or openings between some of the fibers that are oversized and the outside netting layer then serves as useful backup to provide a minimum sizing for particulate passing through which cannot be exceeded and serves to expedite flow of liquid material from the casing while retaining, in general, all solids below a predetermined range.

FIG. 19 shows an alternative version of the filter in which the casing 123 is filled with a semicompacted fibrous material such as a fiberglass matting 193 which forms a lining on the inside of the casing 125. While not as efficient and desirable as the open-cell sponge plastic filter or a consolidated fibrous filter mat, the matted fiberglass material provides many of the advantages of the invention, including an open-top construction providing a fail-safe operation, and a variable capacity providing a more uniform operation. It will be noted that the fiberglass matting shown in FIG. 19 is less consolidated even than the fiber-type filter elements shown in FIGS. 16 and 17.

FIG. 20 shows an alternative version of the invention which is substantially similar to the embodiments shown in FIGS. 10 and 11 but in which the ends 197 of the bails extend completely through the outer casing as well as the inner filter material near the top of such filter material and aids in holding such filter material in position within the casing.

FIG. 20 also illustrates an embodiment of the filter of the invention in which the filter medium adjoins only the sides of the filter casing, the bottom being left open.

It will be understood that the bottom of the casing is imperforate. Basically the filter medium is in the form of a cylinder 127A of filter material rather than of a cup. It is necessary in such case, however, for the filter medium or material to be pressed tightly against the bottom of the filter casing to ensure no leakage of solids occurs around the bottom. Such tight fit is aided by the protruding bails, which, however may usefully support the filter material also when such material has a bottom. Various flange arrangement, not shown, may be used to prevent leakage around the ends of the filter. As may be recognized, the filter material need also not be a continuous cylinder on the sides, but could be discontinuous if the proper precautions to prevent leakage about the ends and sides and to have the filter material over all perforated portions of the filter casing are taken. In general, it is advantageous to have as much of the area, or at least the sides of the filter, devoted to filtering as possible, however.

It will be seen from the above that by use of the inventor's arrangement, a very efficient, yet practical and simple filter arrangement is provided that will filter efficiently almost all small solid particles from septic effluent so that they will not flow through to the drain field and over a period of time, stop up such drain field. A very minor portion of the solid particles may pass through the filter arrangement. However, it has been found that this is not a detriment, since a very small portion of solid particles may actually increase the efficiency of the operation by serving as initiators for further putrifactive degradation and liquidfaction of any solids that may reach the drain field. It has been found by the present inventor in this regard that the use of his open-cell, all-plastic sponge filter material is particularly efficient and effective in filtering out of a septic effluent substantially all solid or semi-solid particulates that may give any difficulty in a drain field. The size of the opening between the cells of the open cell filter material may be selected to filter out almost any size range of solids desired.

The arrangement of the invention is simple and easy to replace and is fail safe because of its open-top structure which allows excess effluent to escape rather than backing up into the original sewage disposal laterals and other piping from the original site of the waste plumbing fixtures from which the sewage originates. As indicated, the open-top form of the invention makes the filter apparatus essentially fail safe and prevents backing up of sewage and other sewage effluent from the sedimentation or septic tank into the plumbing fixtures from which the sewage originates. The cup or bucket shape of the filter, meantime, also provides a very desirable arrangement in which the variable flow rate from the original plumbing fixtures may be adjusted for in the filter to provide a more even flow rate. In times of high flow, excess effluent is in effect stored within the filter, while such excess fluid stored within the filter itself is, during times when the flow of effluent from the septic tank is low, allowed to gradually flow out of the filter into the system, meanwhile very effectively filtering the small particles of solids from the liquid portion of the effluent. The more fluid is stored in the filter, moreover, the greater the hydraulic head upon such liquid material and the faster will be the flow from the filter. Not only is the arrangement of the filter much superior to prior arrangements of filters and septic tank systems, but the new material from which the filter material is formed, i.e. open-cell plastic film material, is much more efficient for a septic tank sewage operation than other filter materials previously used. It has been found that the efficiency of the new filter material and the handling of sewage-type waste waters is several orders of magnitude better than dealing with the removal of small particulates from a waste water by means of previously known and used materials.

In this application and the accompanying claims the following terms have the hereinafter assigned meanings:

The term "septic tank" means any settling tank or other apparatus in which solids are settled or concentrated at a restricted location in such apparatus by the action of gravitational or other similar force.

The terminology "effluent" or "septic effluent" unless otherwise indicated means a liquid, plus any suspended or included solids, derived directly or indirectly from an overflow from a septic tank.

The terminology "ground disposal" means the disposal of waste water and any included solids into the ground by absorbtion or perculation into the ground both vertically and horizontally as appropriate such as by the use of a drainage field, dry well or other perculation enhancing arrangement.

The terminology "T-fitting" or "T-type fitting" means an arrangement of conduits or pipes in which a main conduit adapted for flow conduction is capped or crossed at one end by a second conduit which connects to and crosses the first conduit, the two ends of which cross conduit are nominally open to the passage of liquid flowing in the main conduit. In this application the cross conduit when connected to a fitter is understood to be generally vertically oriented and the upper section of such cross conduit is denoted as the upper arm and the lower section of such cross conduit is denoted as the lower arm.

The terminology "open cell plastic sponge material" or "open cell plastic foam material" means respectively either a flexible or a stiff resin-type polymer material injected or otherwise provided with a gas during consolidation or curring to form bubbles or generally rounded openings within the polymer material, said bubbles remaining as discrete openings in the plastic after consolidation, solidification, hardening or curring, and at least a substantial number of said bubbles being interconnected in a manner such that a liquid may move from one bubble to another, the interconnecting openings between the bubbles or openings being largely smaller in transverse dimension than the bubbles or generally spheroidal openings that are interconnected by said interconnecting openings.

The term "consolidated" means brought together into a more or less distinct collection or body such as by manual or mechanical compression, molding or the like force or movement. The consolidated material may hold more or less together either statically by form or mechanical entanglement or by molecular adhesion through chemical or other means or like changes effecting adhesion or consolidation.

The term "U-shaped" or "concave" when used in the context of a filter, means a filter having generally the shape of a cup, bucket, water glass or other such container having a flat or sloping bottom and upwardly inclined sides surrounding the bottom, which sides will usually, but not necessarily, be circular in outline. A cylindrical or frustoconical shape is included, including various upwardly or laterally curved wall sections and bottom sections. The filter will be open-topped or at the least be provided with a liquid overflow outlet at or near the top in case of backup of liquid in the filter. Generally, the filter will have a greater height than diameter, but not necessarily.

While the present invention has been described at some length and with some particularity with respect to several described embodiments, as well as the best mode now known to the applicant, it is not intended that the Applicant's invention should be limited to any such particulars or embodiments or to any particular embodiment, but is to be construed broadly with reference to the appended claims so as to provide the broadest possible interpretation of such claims in view of the prior art and therefore to effectively encompass the intended scope of the invention.

I claim:

1. In an effluent disposal system including an upstream septic tank, a downstream ground percolating disposal means and an overflow conduit conducting effluent from the septic tank to the ground disposal means, an effluent filtering arrangement between the septic tank and the disposal field comprising:
   (a) a chamber serving at least in part as a filter chamber having an inlet connected to the conduit conducting effluent from the septic tank and an outlet connected with the conduit leading to the disposal field,
   (b) a filtering means having a generally upwardly extending side or sides and a bottom connecting said sides at least a portion of at least one of which sides and bottom is perforate,
   (c) a filter medium means interposed in the perforate portion of the filtering means to filter solids from effluent passing through the perforate section,
   (d) conduit means connected with the inlet to discharge effluent from the septic tank into the top of the filtering means,
   (e) the depth of the filtering means being sufficient to at least temporarily retain a pool of liquid therein sufficient to provide a variable depth pool of liquid adjacent the filter medium to adjust the filter rate of the filter means to varying flows,
   (f) the upper portion of the filter means being open to allow for overflow of effluent from the filter means in case the filter medium becomes clogged or the flow rate remains greater than the feed rate over an excessive period of time due to partial occlusion of the filter over time,
   (g) support means to retain the filter means upright in the filter chamber with the perforated portion unoccluded by any contiguous structure, and
   (h) the support means being arranged and constructed together with the filtering means to facilitate withdrawal of the filter medium means through an opening in the upper portion of the chamber and substitution by a replacement filter medium means.

2. An effluent disposal system in accordance with claim 1 wherein the filter medium means is comprised of a fibrous filter material.

3. An effluent disposal system in accordance with claim 2 wherein the fibrous filter material has a consolidated structure in which at least some of the fibers are adhered to at least some other contiguous fibers.

4. An effluent desposal system in accordance with claim 3 wherein at least the majority of the fibers of the fibrous filter material adhere to other fibers with which they are in contact.

5. An effluent disposal system in accordance with claim 2 wherein the fibers are consolidated only by mechanical means and do not substantially adhere to each other.

6. An effluent disposal system in accordance with claim 1 wherein the filter medium means is comprised of an open-cell plastic sponge-like material.

7. An effluent disposal system in accordance with claim 6 wherein the bottom of the filter means is imperforate.

8. An effluent disposal system in accordance with claim 1 wherein the filtering means and the filter medium means are unitary and comprise a stiff, generally U-shaped plastic means having an open-cell structure throughout at least a substantial portion thereof extending from an inner wall to an outer wall constituting a filtering wall.

9. An effluent disposal system in accordance with any of claims 1, 2, 6, and 8 wherein the support means for the filter means and filter medium supports the filter means by suspension in the filter chamber by means comprising loop means interengaged with a hook-type means.

10. An effluent disposal system in accordance with claim 9 wherein the hook-type means comprises notch means associated with an upper arm of the cross member of a T-fitting, the lower arm of which cross member extends into the upper portion of the filter medium and means and the loop means comprises a bail on the filter.

11. An effluent disposal system in accordance with any of the claims 1, 2, 6 or 8 wherein the conduit means connected with the inlet of the filter chambers includes a T-fitting having the cross conduit oriented substantially vertically, the upper arm of which T-fitting is open and the lower arm of which is arranged to conduct septic effluent into the upper portion of the filtering means.

12. An effluent disposal system in accordance with claim 11 wherein the outside of the lower arm of the T-fitting is substantially at least indirectly in contact with the filtering means at least through the filter medium means.

13. An effluent disposal system in accordance with claim 2 wherein a perforated portion of the filter means is the bottom and the filter means is supported above the bottom of the chamber.

14. An effluent disposal system in accordance with claim 13 wherein at least a portion of the sides of the filter means is perforated and a separate filter medium abuts the perforated section.

15. An effluent disposal system in accordance with claim 14 wherein the filter means is supported from a bail hooked over a notch in the top of a T-fitting serving as the inlet into the chamber.

16. A septic tank effluent filtering apparatus comprising:
   (a) a below-ground-level chamber arranged and adapted to receive septic tank overflow from a septic tank through a conduit,
   (b) a T-fitting attached to the conduit and extending at least partially into the chamber from the conduit,
   (c) a concave filter supported under the end of a lower leg of the T-fitting with the open end of the concavity facing upwardly toward the lower leg of the T-fitting,
   (d) the concave filter having a diameter and height sufficient to receive without over-flowing the normal surge from the septic tank incident to operation of plumbing facilities attached to sewage connections leading into the septic tank, (e) said concave filter having a perforated portion effectively covered with a restricted opening filter material through which septic effluent passes while leaving solid material upon the filter material, and (f) means to remove the filtered effluent discharged into the sunken chamber from such chamber to subsequent effluent treatment and disposal means.

17. An apparatus in accordance with claim 16 wherein the concave filter is supported upright in the chamber by suspension additionally comprising:

(g) suspension means attached to said filter and extending about securing means associated with the T-fitting.

18. An apparatus in accordance with claim 16 wherein the securing means is stabilized on the T-fitting by means of a depression in the top of said T-fitting and the suspension means is a bail which fits into the depression.

19. An apparatus in accordance with claim 18 wherein the filter means is perforated on both the sides and the bottom.

20. An apparatus in accordance with claim 18 wherein the filter is suspended clear of any normal accumulation of effluent in the chamber.

21. An apparatus in accordance with claim 19 wherein the configuration and dimensions of the filter and the chamber, including the exit from the chamber, is such that the filter is partially, but not wholly, submerged in effluent within the chamber.

22. An apparatus in accordance with claim 16 additionally comprising:

(g) support means mounted upon the bottom of the chamber upon which support means the filter means is supported.

23. An apparatus in accordance with claim 22 wherein the filter means is perforated on both the sides and the bottom.

24. An apparatus in accordance with claim 23 wherein the filter means is supported clear of the normal effluent level in the chamber.

25. An apparatus in accordance with claim 23 wherein the configuration and dimensions of the filter and the chamber, including the exit from the chamber, is such that the filter is partially, but not wholly, submerged in effluent within the chamber.

26. An apparatus in accordance with any one of claims 16, 17, 18, 20, 21, 22, 24 or 25 wherein the restricted opening filter material comprises a polymeric open-cell material.

27. An apparatus in accordance with any one of claims 16, 17, 18, 19, 20, 21, 22, 23, 24 or 25 wherein the restricted opening filter material is a fibrous material.

28. A method of filtering septic tank effluent between a septic tank and a ground disposal means comprising:

(a) passing the septic effluent into a filtering chamber through conduit means leading directly into the upper portion of an open-topped, generally U-shaped, perforate filtering means at least lined with an open-cell polymeric replaceable filtering material, (b) passing the septic effluent through the open-cell polymeric material to filter solid materials more than a predetermined diameter from the septic effluent, (c) collecting the filtered effluent in the lower portion of the filter chamber and conducting to said ground disposal means, (d) refraining from actively inhibiting unfiltered septic effluent overflowing from the top of the U-shaped filtering means if such filtering means should become at least partially occluded, (e) monitoring the build-up of solid materials upon the inside of the filter medium, and (f) upon the deposit of sufficient solid material upon the inside of the filter medium to detrimentally decrease filtering to a degree which may cause detrimental build up of the normal level of effluent in the U-shaped filtering during filtering, removing the used polymeric replaceable filtering material and replacing with fresh polymeric filtering material.

29. A method of filtering septic tank effluent in accordance with claim 28 wherein only a polymeric lining of the filtering means is removed and replaced.

30. A method of filtering septic tank effluent in accordance with claim 28 wherein substantially the entire U-shaped filter means is comprised of open-cell polymeric material and is removed when a filtering rate-retarding amount of solid material is deposited upon the interior of the U-shaped filter means and a replacement filter means is substituted for said removed filter means.

31. A filtering apparatus for filtering solids from a septic tank before passing said effluent to a ground disposal means comprising:

(a) generally U-shaped filter means designed and constructed for support within a filtering chamber in a position to receive effluent from said septic tank via conduit means into the interior of said filter, (b) said filter means including:
(i) an outer perforate casing,
(ii) an inner filtering medium comprising a polymeric open-cell polymeric material having openings between the cells having a size on the average, not more than one-thirty second of an inch forming a lining in the perforate casing and generally supported by said casing, (c) a support means for said filter means, and (d) a T-fitting means associated with the filter means arranged and constructed for receipt of effluent from a conduit connected with a septic tank into the trunk of the T and then through one arm of the cross conduit of the T which is vertically oriented into the top of the filter means to direct effluent into said filter means, the other arm of the T being open and available for emergency overflow of effluent in case of at least partial blockage of the filter.

32. A filtering apparatus in accordance with claim 31 wherein the lower arm of the T-fitting and the upper portion of the filter means are substantially in at least indirect contact, sufficient to at least impede the passage of effluent between or through the region of contact to decrease the dynamic pressure of the effluent against the inner surface of the filter means.

* * * * *